(12) United States Patent
Shiloh et al.

(10) Patent No.: US 6,245,299 B1
(45) Date of Patent: Jun. 12, 2001

(54) MODULAR DIELECTRIC BARRIER DISCHARGE DEVICE FOR POLLUTION ABATEMENT

(75) Inventors: Joseph Shiloh, Haifa; Avner Rosenberg, Bet She'Arim; Elhanan Wurzberg, Kiriat Motzkin, all of (IL)

(73) Assignee: State of Israel - Ministry of Defense Rafael Armament Development Authority, Haifa (IL)

( * ) Notice: Subject to any disclaimer, the term of this patent is extended or adjusted under 35 U.S.C. 154(b) by 0 days.

(21) Appl. No.: 09/319,958
(22) PCT Filed: Nov. 24, 1998
(86) PCT No.: PCT/IL98/00547
§ 371 Date: Jun. 14, 1999
§ 102(e) Date: Jun. 14, 1999
(87) PCT Pub. No.: WO99/26726
PCT Pub. Date: Jun. 3, 1999

(30) Foreign Application Priority Data
Nov. 25, 1997 (IL) ........................................................ 122300

(51) Int. Cl.[7] ................. A62B 7/08; A61L 2/00; B01J 19/08; B01J 19/12
(52) U.S. Cl. ...................... 422/121; 422/22; 422/186.04; 95/3; 96/19; 96/80
(58) Field of Search ................. 422/4, 22, 121, 422/122, 186.04; 95/78, 81; 96/19, 26, 54, 69, 94, 95, 99

(56) References Cited

U.S. PATENT DOCUMENTS

| | | | |
|---|---|---|---|
| 5,061,462 | 10/1991 | Suzuki | 422/186.04 |
| 5,194,291 | 3/1993 | D'Aoust et al. | 148/276 |
| 5,387,775 | 2/1995 | Kang | 219/121.52 |
| 5,427,747 | * 6/1995 | Kong et al. | 422/186 |
| 5,458,856 | 10/1995 | Marie et al. | 422/186 |
| 5,467,722 | 11/1995 | Meratla | 110/345 |
| 5,478,532 | 12/1995 | Uhm | 422/186 |
| 5,490,973 | 2/1996 | Grothaus et al. | 422/186.04 |
| 5,582,632 | * 12/1996 | Nohr et al. | 95/78 |
| 6,007,785 | * 12/1999 | Liou | 422/186.07 |
| 6,083,355 | * 7/2000 | Spence | 204/164 |
| 6,119,455 | * 9/2000 | Hammer et al. | 60/301 |
| 6,146,599 | * 11/2000 | Ruan et al. | 422/186.04 |

FOREIGN PATENT DOCUMENTS

0785016A1   7/1997   (EP) .............................. B01D/53/75

OTHER PUBLICATIONS

Zoran Falkenstein "Processing of $C_3H_7OH$, $C_2HCl_3$ and $CCL_4$ in Flue Gases Using Silent Discharge Plasmas (SDPs), Enhanced by (V)UV at 172 nm and 253.7", J. Adv. Oxid. Technol. vol. 2, No. 1, pp. 223–238, 1997.

* cited by examiner

*Primary Examiner*—Robert J. Warden, Sr.
*Assistant Examiner*—Monzer R Chorbaji

(57) ABSTRACT

A device (10) for purifying a gas stream (30) made up of a plurality of DBD cells (12a, 12b, 12c) in series and, for each of the DBD cells (12a, 12b, 12c), a power supply (24a, 24b, 24e) for providing alternating current to each DBD cell (12a, 12b, 12e).

34 Claims, 8 Drawing Sheets

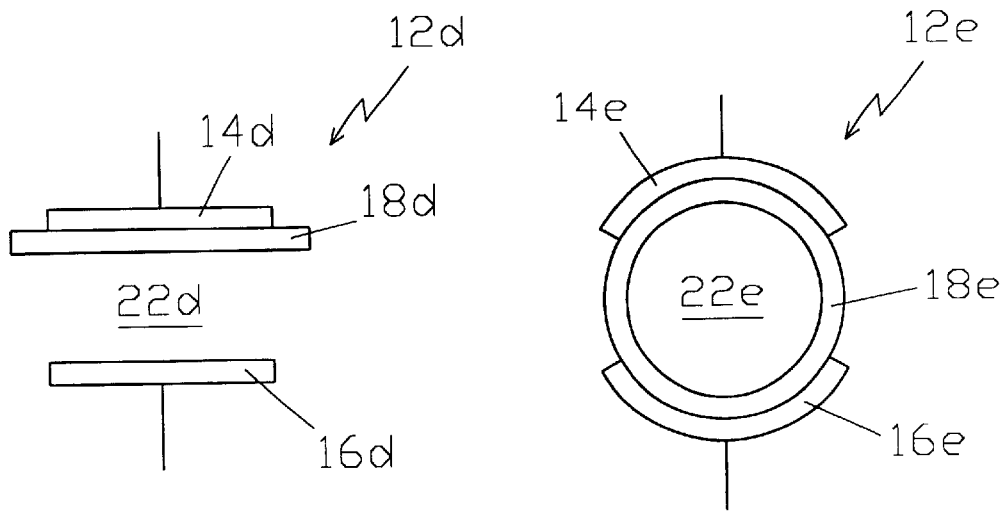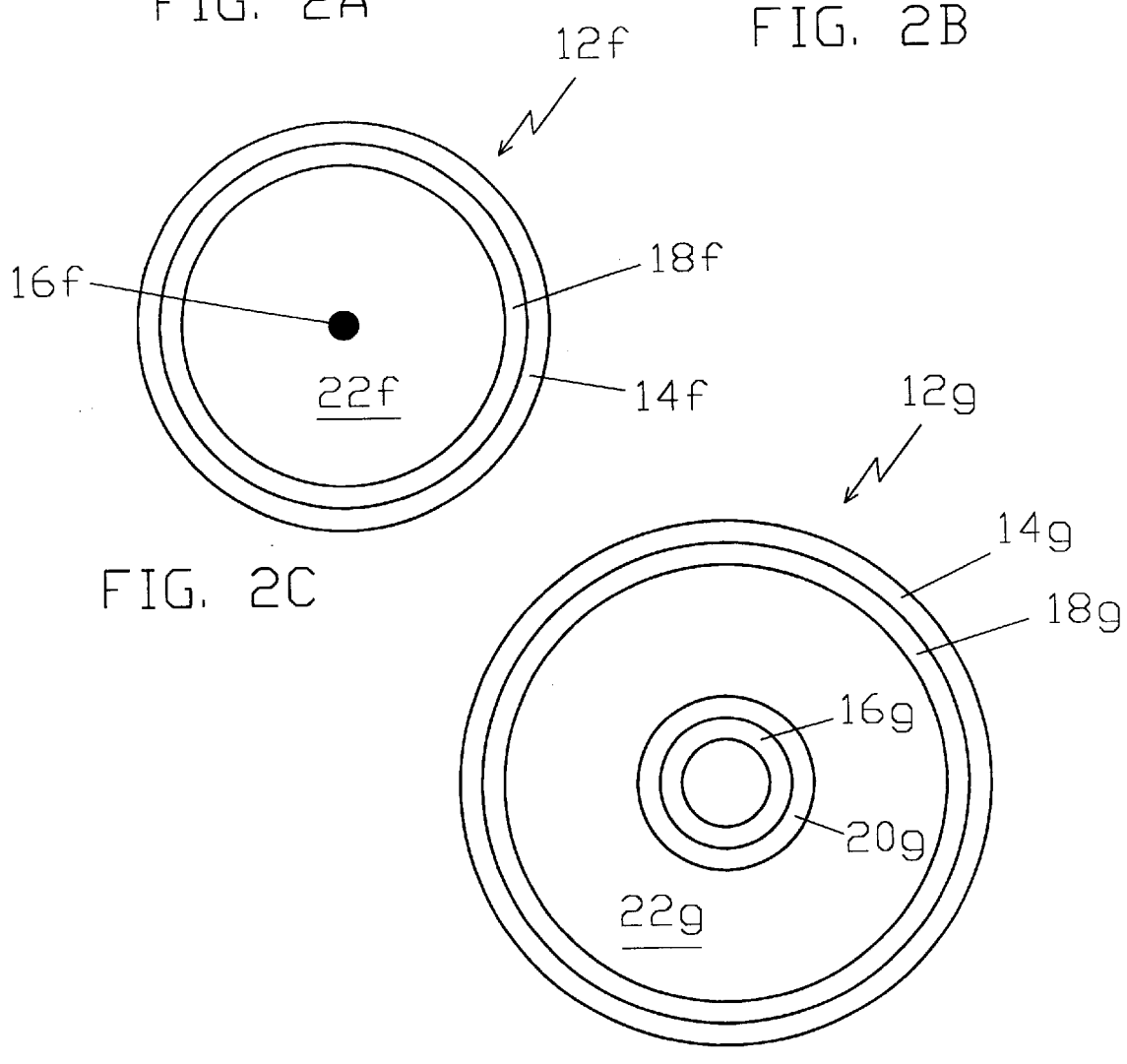

MODULAR DIELECTRIC BARRIER DISCHARGE DEVICE FOR POLLUTION ABATEMENT

FIELD AND BACKGROUND OF THE INVENTION

The present invention relates to pollution abatement and, more particularly, to a device for destroying gaseous pollutants by passing the pollutants through a plasma and possibly additional gas.

Gases that are hazardous or otherwise undesirable are produced by many commercial and industrial processes. Notable examples include oxides of nitrogen and sulfur, emitted, for example, from internal combustion engines and from power plants; chemical and biological agents such as sarin and tabun; and fluorine-containing greenhouse gases (perfluorocarbons) such as $CF_4$, $CHF_3$, $C_2HF_5$, $C_2H_2F_4$ and $SF_6$ that are used in the fabrication of semiconductor devices. There are three general method to control emissions of these gases:

1. Control the processes that generate or use such gases to minimize their production or use.
2. In the case of gases deliberately introduced to industrial processes such as semiconductor device fabrication, collect and recycle the emitted gases.
3. Convert the gases to environmentally safer compounds.

The present invention addresses the third general method. Traditionally, the semiconductor industry has incinerated effluent gases. The burners used tend to be large, inefficient and expensive. Recently, it has been proposed to use plasmas, such as are used for generating ozone from oxygen, to destroy unwanted gaseous species. The high energy electrons of a plasma deliver their energy efficiently to atoms and molecules without heating the device which creates the plasma. The modification of the gas molecules is done by direct interaction with the electrons through electron attachment, dissociation or ionization, or through interaction with free radicals generated by the electrons.

There are two types of plasmas that may be used for pollution abatement: thermal plasmas and non-thermal plasmas. A thermal plasma is one that is in thermal equilibrium. Such plasmas may be generated by, for example, continuous RF or microwave energy. The particle energy in the plasma is a function of the plasma temperature, on the order of kT, where k is Boltzmann's constant and T is the plasma temperature. For typical thermal plasmas, the particle energy is on the order of electron volts. Non-thermal plasmas generate much higher electron energies, and therefore are characterized by more efficient energy transfer than thermal plasmas. The disadvantage of non-thermal plasmas is that they are more difficult to control and to keep uniform than are thermal plasmas.

Two types of non-thermal plasmas have been considered for pollution abatement: pulsed corona discharge and dielectric barrier discharge (DBD). In pulsed corona discharge, the plasma is generated between two electrodes by a pulse of high voltage across the electrodes, which creates a discharge in the gas between the electrodes. To prevent the creation of a single arc discharge which would carry the entire current and create a non-uniform plasma, the voltage pulse is kept short, on the order of tens of nanoseconds, and is repeated at a rate on the order of hundreds of times per second. The plasma discharge channels thus created do not have enough time to turn into an arc, so many discharge channels are created during the short lifetime of the pulse. Nevertheless, it is difficult to create a very uniform corona discharge. A representative U.S. patent describing a pulsed corona reactor is U.S. Pat. No. 5,490,973, to Grothaus et al.

In a DBD device, one or both of the electrodes are covered with an insulator so that the energy for the discharge is supplied capacitatively through the insulator. This limits the amount of energy that each discharge channel can receive. It therefore is possible to generate more channels and obtain a more uniform discharge.

SUMMARY OF THE INVENTION

According to the present invention there is provided a device for purifying a gas stream, including: (a) a plurality of DBD cells in series; (b) for each of the DBD cells, a power supply for providing alternating current to the each DBD cell.

According to the present invention there is provided a method for purifying a gas stream, including the steps of: (a) providing a plurality of DBD cells in series; and (b) causing the gas stream to flow through said DBD cells.

The basic structure of the present invention is a plurality of DBD cells in series. By "series" is meant, not that the cells are electrically in series, for indeed each cell is part of an independent electrical circuit, but that the cells are arranged geometrically so that the gas stream to be purified passes sequentially from one cell to the next. Each cell is provided with its own independent high frequency power supply. In conformity with common usage, these power supplies are referred to herein as supplying "alternating current" to the DBD cells, although the parameter of the power supplies that actually is controlled is the voltage, with the supplied currents then depending on the impedances of the DBD cells according to Ohm's law. Preferably, the power supplies are switching mode resonant power supplies.

The use of several small DBD cells instead of one large DBD cell has the following advantages:

1. The smaller capacitance of a small cell makes it easier to drive at high frequencies. At higher frequencies, more discharge channels are created, so the plasma is more uniform. The smaller power supplies used with the smaller cells are simpler and more efficient than the large power supply that would be needed for a single large cell.
2. A plurality of cells is easier to control than a single cell. It is easier and more efficient to control the concentrations of chemical species inside a plurality of small cells than inside a single large cell. According to the present invention, sensors are provided to measure the concentrations of gaseous species emerging from each cell and plasma conditions inside each cell. Power supply parameters such as frequency and voltage are adjusted adaptively, in accordance with the results of the measurements, to enhance the destruction of the unwanted species.
3. A reactor made of a plurality of cells is modular. If one cell must be taken off line for maintenance, the reactor can continue to function.

The scope of the present invention also includes the injection of an additive gas, such as nitrogen or oxygen, into the gas stream, at the inlet to one or more of the cells, to enhance the destruction of the unwanted gaseous species and their conversion to safe gases. As in the case of the power supply parameters, the rate of injection of the additive gas is controlled in accordance with the measured concentrations and plasma conditions.

BRIEF DESCRIPTION OF THE DRAWINGS

The invention is herein described, by way of example only, with reference to the accompanying drawings, wherein:

FIGS. 2A through 2F are cross sections of alternative constructions of a DBD cell;

DESCRIPTION OF THE PREFERRED EMBODIMENTS

The present invention is of a modular DBD reactor which can be used to destroy pollutant species in a gas stream, converting the pollutant species to environment-friendly gases. Specifically, the present invention can be controlled adaptively to optimize the destruction of the unwanted species.

The principles and operation of a modular DBD reactor according to the present invention may be better understood with reference to the drawings and the accompanying description.

Figure 1:
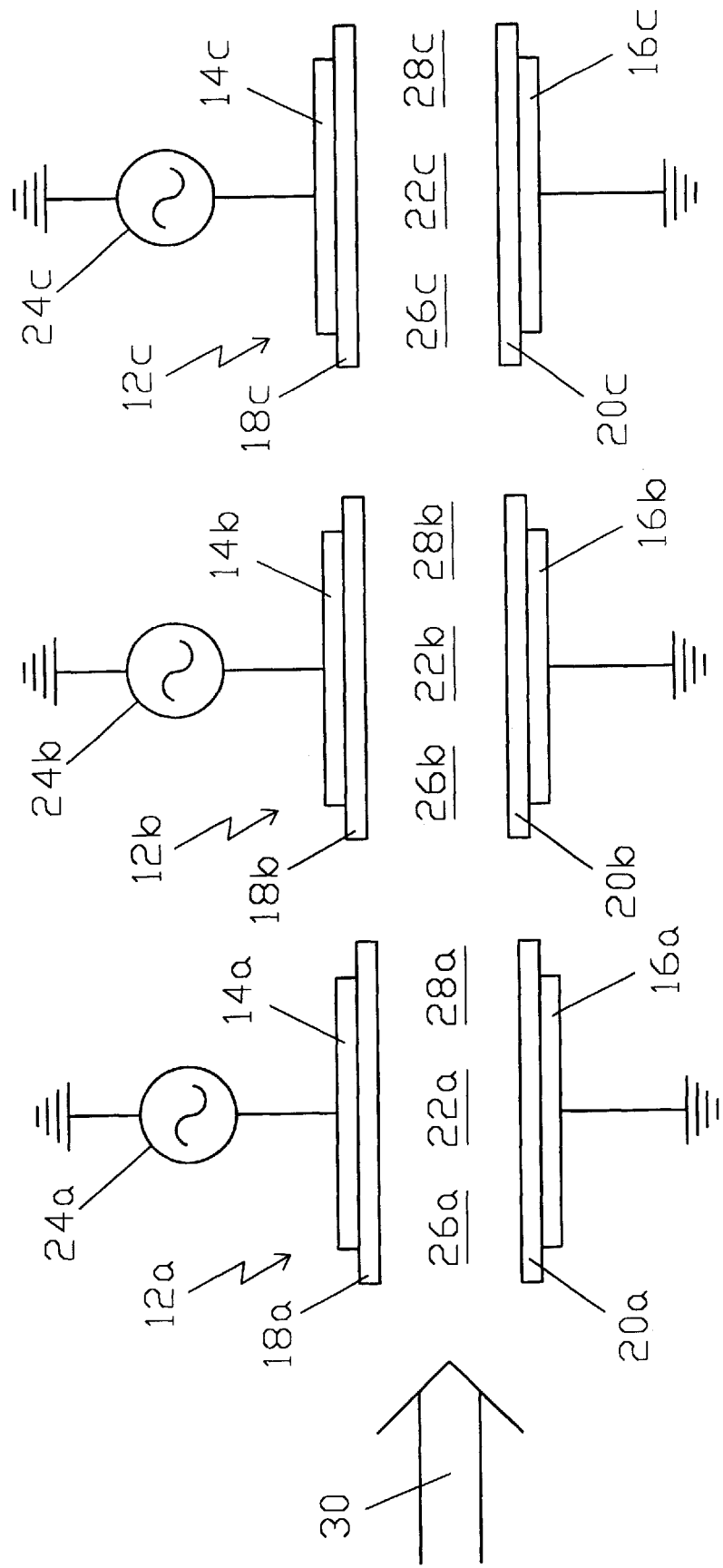
FIG. 1 is a schematic illustration of a basic device of the present invention.

Referring now to the drawings, FIG. 1 is a schematic illustration of a basic device 10 of the present invention. Device 10 includes three DBD cells 12a, 12b and 12c. Each DBD cell includes two electrodes: cell 12a includes electrodes 14a and 16a, cell 12b includes electrodes 14b and 16b, and cell 12c includes electrodes 14c and 16c. Electrode 14a is covered by a dielectric layer 18a. Electrode 14b is covered by a dielectric layer 18b. Electrode 14c is covered by a dielectric layer 18c. Electrode 16a is covered by a dielectric layer 20a. Electrode 16b is covered by a dielectric layer 20b. Electrode 16c is covered by a dielectric layer 20c. Dielectric layers 18a and 20a define between them a gap 22a. Dielectric layers 18b and 20b define between them a gap 22b. Dielectric layers 18c and 20c define between them a gap 22c. Electrodes 16a, 16b and 16c are grounded. Electrodes 14a, 14b and 14c are connected to high frequency power supplies 24a, 24b and 24c respectively.

Each DBD cell has an input end, into which a gas stream 30 to be purified enters, and an output end, from which gas stream 30 exits after treatment in that cell: cell 12a has an input end 26a and an output end 28a, cell 12b has an input end 26b and an output end 28b, and cell 12c has an input end 26c and an output end 28c. The cells are arranged in series, so that gas stream 30, after exiting cell 12a via output end 28a, immediately enters cell 12b via input end 26b, and after exiting cell 12b via output end 28b, immediately enters cell 12c via input end 26c.

Electrodes 14a, 14b, 14c, 16a, 16b, and 16c are made of an electrically conductive material, preferably a metal, most preferably copper, aluminum or stainless steel. Dielectric layers 18a, 18b, 18c, 20a, 20b and 20c are made of an electrical insulator, preferably a ceramic such as alumina or quartz. For simplicity, only three DBD cells are shown in FIG. 1. Typically, device 10 includes 10 cells, but the scope of the present invention includes any convenient number of cells in device 10 greater than or equal to 2. If more than 5 cells are used, one cell may be taken off line for maintenance without disabling the entire device.

Figure 2E:
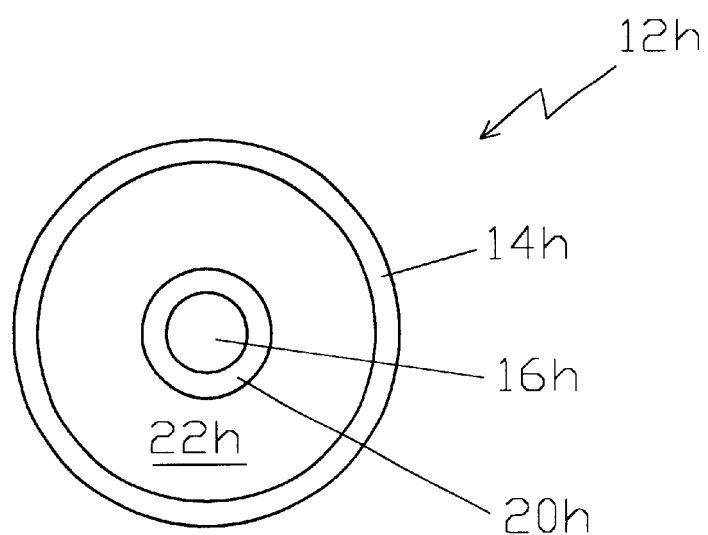
Figure 2F:
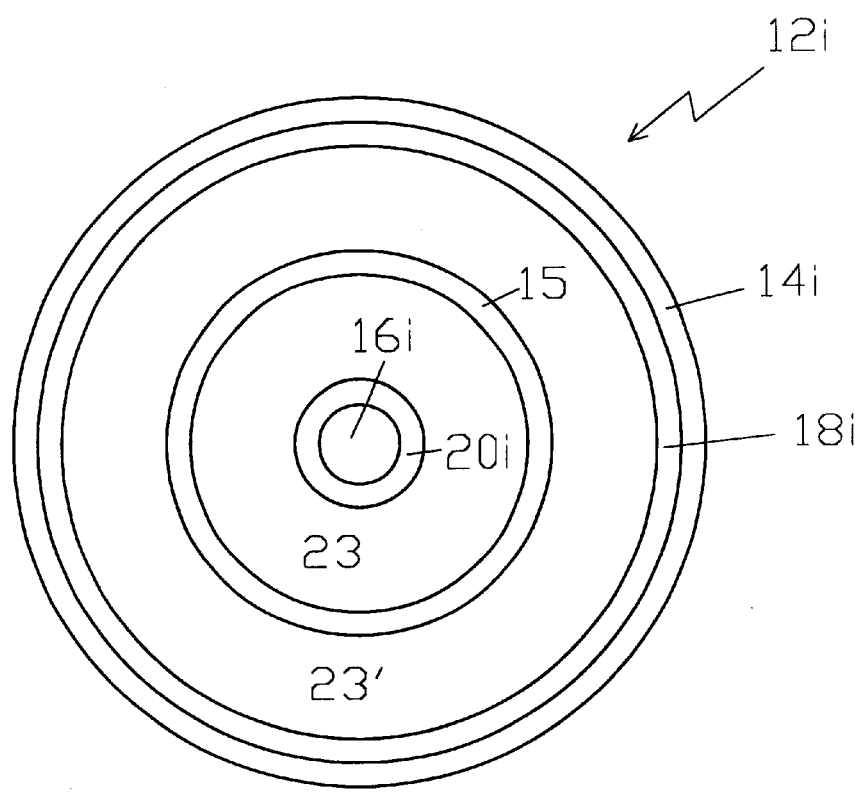

FIGS. 2A, 2B, 2C, 2D, 2E and 2F show alternative constructions of DBD cells. FIG. 2A is an axial cross section of a cell 12d in which only one electrode 14d is covered by a dielectric layer 18d; electrode 16d is bare. Electrode 16d and dielectric layer 18d define between them a gap 22d through which gas stream 30 flows. FIGS. 2B, 2C, 2D, 2E and 2F are transverse cross sections of cylindrical DBD cells. FIG. 2B shows a cell 12e that includes two electrodes 14e and 16e, in the form of cylindrical sections, on opposite sides of a dielectric tube 18e. In a device 10 including cells such as cell 12e, gas stream 30 flows through interior 22e of dielectric tube 18e. FIG. 2C shows a cell 12f in which one electrode is an electrically conductive cylinder 14f and the other electrode is an electrically conductive wire 16f concentric with cylinder 14f. The inner surface of cylinder 14f is coated with a cylindrical dielectric layer 18f. In a device 10 including cells such as cell 12f, gas stream 30 flows through interior 22f of cylinder 18f. FIG. 2D shows a cell 12g in which the electrodes are concentric, electrically conductive cylinders 14g and 16g. The inner surface of cylinder 14g is coated with a cylindrical dielectric layer 18g. The outer surface of cylinder 16g is coated with a cylindrical dielectric layer 20g. In a device 10 including cells such as cell 12g, gas stream 30 flows through annulus 22g defined by dielectric cylinders 18g and 20g. FIG. 2E shows a cell 12h in which the electrodes are concentric, electrically conductive cylinders 14h and 16h, cylinder 16h being solid rather than hollow. Cylinder 14h is bare. The surface of cylinder 16h is coated with a cylindrical dielectric layer 20h. In a device 10 including cells such as cell 12h, gas stream 30 flows through interior 22h of cylinder 14h. FIG. 2F shows a cell 12i in which there are three concentric electrodes: hollow, electrically conductive cylinders 14i and 15, and solid, electrically conductive cylinder 16i. The inner surface of cylinder 14i is coated with a cylindrical dielectric layer 18i. The surface of cylinder 16i is coated with a cylindrical dielectric layer 20i. In a device 10 including cells such as cell 12i, gas stream 30 flows through both an annulus 23 defined by cylinders 15 and 20i and an annulus 23' defined by cylinders 18i and 15. In the operation of a cell such as cell 12i, cylinder 15 is connected to a power supply such as power supply 24a, 24b or 24c, and both cylinders 14i and 16i are grounded.

Figure 6:
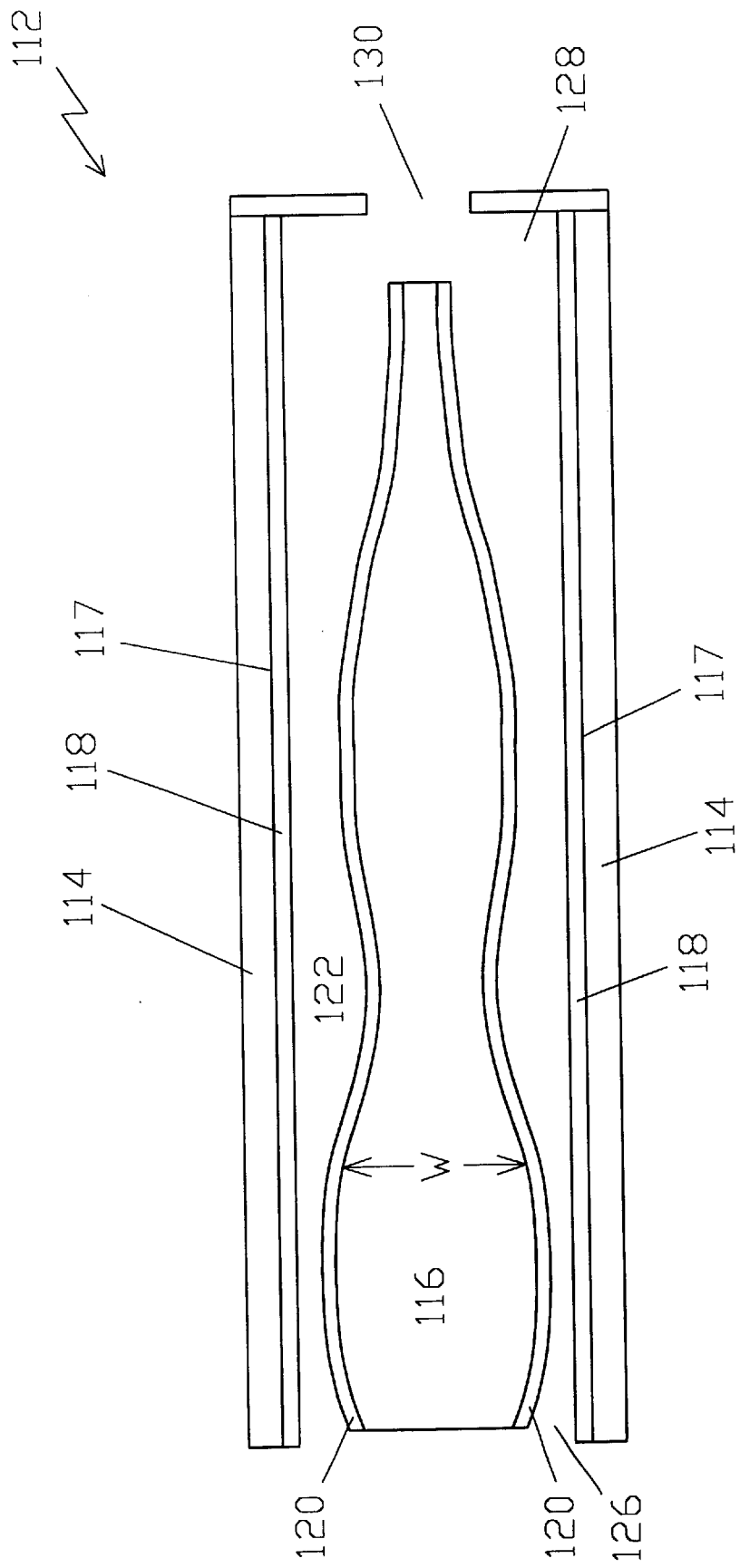
FIG. 6 is an axial cross section of an improved embodiment of the DBD cell of FIG. 2E.

FIG. 6 is an axial cross section of an improved embodiment 112 of cell 12h. Cell 112 includes a cylindrical outer electrode 114 and an inner electrode 116 having an axially varying transverse width w. In particular, w varies sinusoidally with a decreasing amplitude from input end 126 to output end 128. Inner electrode 116 is coated with a dielectric layer 120 whose transverse width also varies axially. Inner surface 117 of outer electrode 114 is coated with a layer 118 of a catalyst such as black platinum or titanium for catalyzing the destruction of the pollutant species in gas stream 30. Cell 112 also has, at output end 128, an exit aperture 130 that limits the velocity of gas stream 30, thereby increasing the pressure of the gas in interior 122 of cell 112. Alternatively, catalyst layer 118 is on inner electrode 116 and dielectric layer 120 is on inner surface 117 of outer electrode 114.

Typically, the lengths of DBD cells of the present invention are on the order of several centimeters, as are the diameters of cylindrical DBD cells and the widths of planar cells. The thicknesses of the dielectric layers and the widths of the gaps between dielectric layers, or between a dielectric layer and an opposite bare electrode, typically are on the order of several millimeters.

Figure 3:
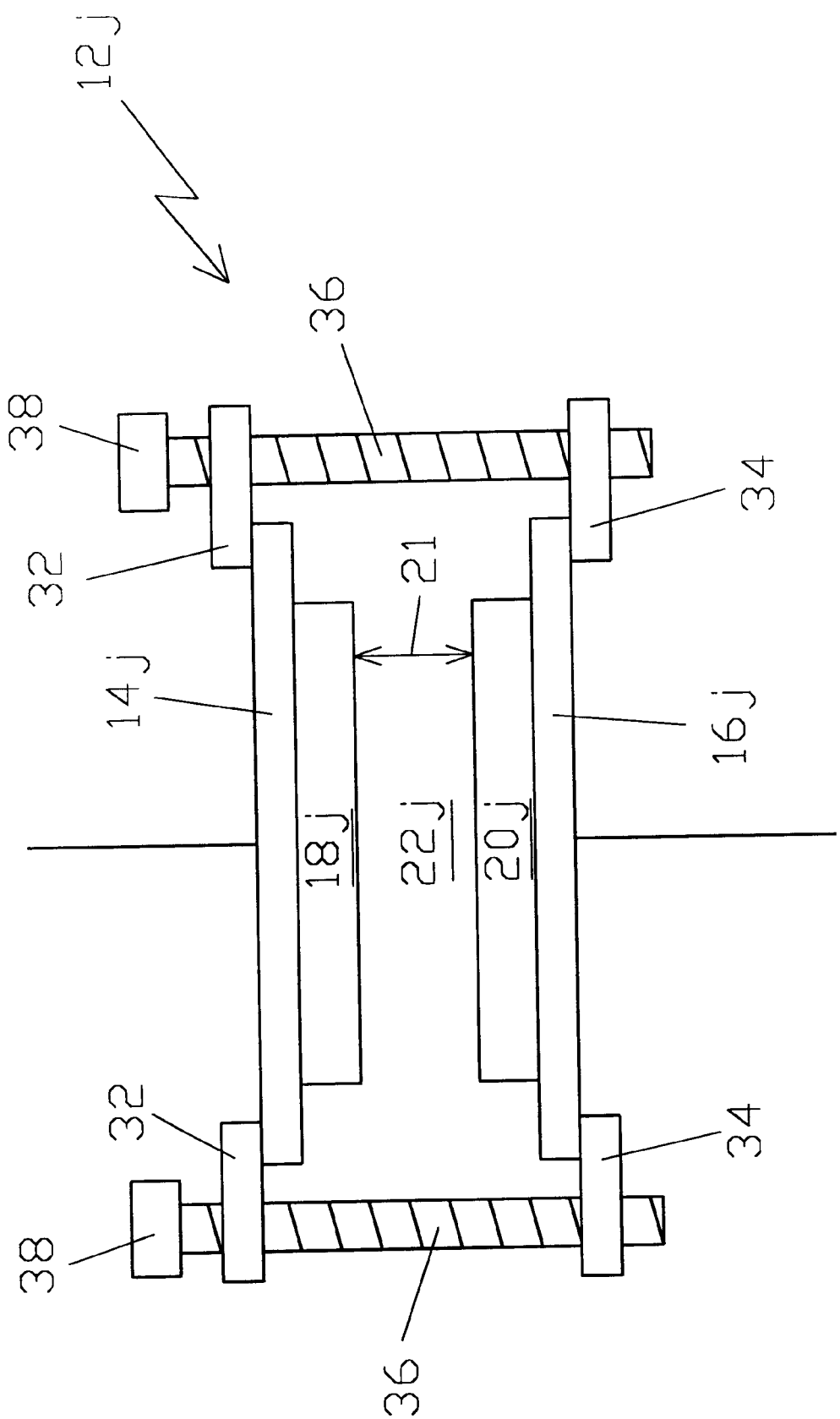
FIG. 3 is a schematic axial cross section of another DBD cell.

FIG. 3 is a schematic axial cross section of a DBD cell 12j that is geometrically similar to cells 12a, 12b and 12c, having two electrodes 14j and 16j whose facing surfaces are coated with dielectric layers 18j and 20j, dielectric layers 18j and 20*j* defining between them a gap 22*j*. Cell 12*j* is provided with a mechanism for changing width 21 of gap 22*j*. Specifically, cell 12*j* is mounted within an insulating housing that consists of an upper part 32 rigidly attached to electrode 14*j* and a lower part 34 rigidly attached to electrode 16*j*. Parts 32 and 34 have matching threaded holes through which are inserted threaded rods 36. Threaded rods 36 are extensions of the shafts of stepping motors 38. Stepping motors 38 are activated as described below to rotate rods 36 to change width 23 during the operation of a device 10 that includes a cell such as cell 12*j*. The mechanism illustrated in FIG. 3 is only illustrative: the scope of the present invention includes all suitable mechanisms for adjusting the interior geometries of the DBD cells.

Figure 4:
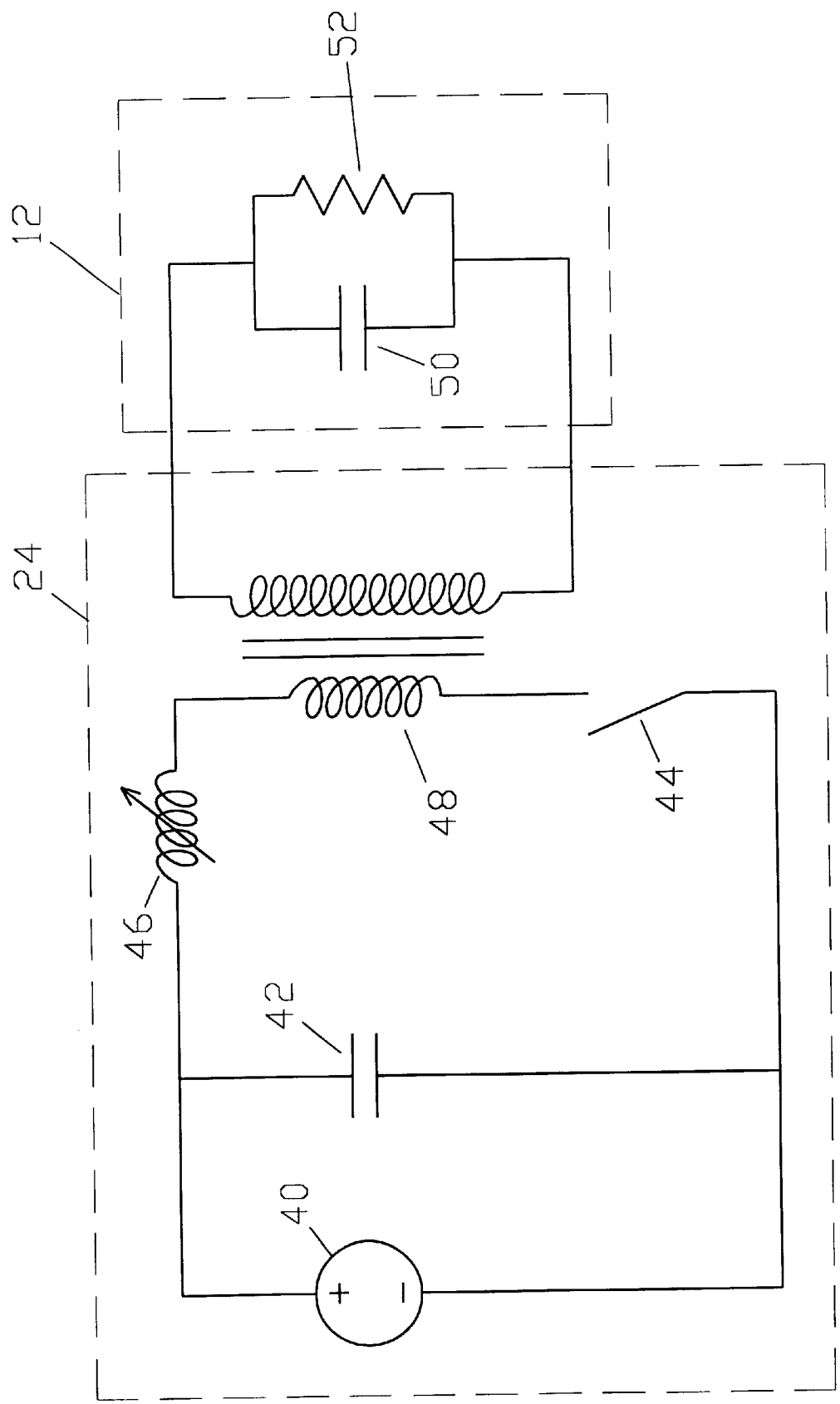
FIG. 4 is a schematic diagram of a power supply.

Preferably, power supplies 24*a*, 24*b* and 24*c* are switching mode resonant power supplies, which are simple, efficient and inexpensive. FIG. 4 is a schematic diagram of a representative such power supply 24. Power supply 24 includes a DC power source 40 in series with a switch 44, a variable inductance 46, and the primary winding of a transformer 48; and in parallel with a capacitor 42. The secondary winding of transformer 48 is shown supplying the output AC current of power supply 24 to a DBD cell 12 represented by an equivalent circuit that includes a capacitance 50 in parallel with a resistance 52. Power source 40 supplies a DC voltage on the order of several tens to hundreds of volts. Capacitor 42 is of low equivalent series resistance, to enable high peak currents through the primary coil of transformer 48. Transformer 48 isolates power supply 24 from cell 12 and matches the load voltage and impedance of cell 12. Typically, the peak voltage supplied by the secondary winding of transformer 48 to cell 12 is on the order of about 300 volts to about 100 kilovolts. Variable inductance 46 is used for matching resonant conditions. Capacitance 50 alone represents cell 12 when cell 12 is empty. When cell 12 generates a plasma, the power drawn by the generation of the plasma is represented by resistance 52.

The main limitation on the performance of power supply 24 is the performance of switch 44. Solid state IGBT switches work well up to frequencies of about 100 kilohertz at voltages up to one to two kilovolts. MOSFET switches can operate at frequencies up to several MHz at voltages between several hundred to several thousand volts, but as the frequency is increased, the power that can be supplied by power supply 24 with a MOSFET switch 44 decreases. In practice, the range of frequencies at which power supply 24 operates is from about 10 kilohertz to about 3 megahertz.

In operation, switch 44 is opened and closed at high frequency. A typical mode of operation is opening and closing switch 44 at a frequency of one megahertz at 50% duty. When the switching frequency is equal to the resonant frequency of load capacitance 50 with the parasitic inductance of transformer 48 combined with variable inductance 46, a high AC voltage is developed across capacitance 50. The maximum voltage attainable is limited by circuit losses in power supply 24 and by power absorbed by resistance 52. The optimal voltage and interelectrode gap width is a function of the pressure of gas stream 30. Device 10 may be operated at pressures of gas stream 30 from sub-Torr pressures to several Bars. Preferably, the pressure is on the order of tens of Torrs and the driving voltages are on the order of kilovolts.

Preferably, the high-frequency opening and closing of switch 44 is intermittent, a practice commonly known as "chopping". This allows the plasma to relax and provides additional variation of the plasma chemistry. Preferably, this chopping is effected at a frequency between about 10 hertz and about 100 kilohertz.

Figure 5:
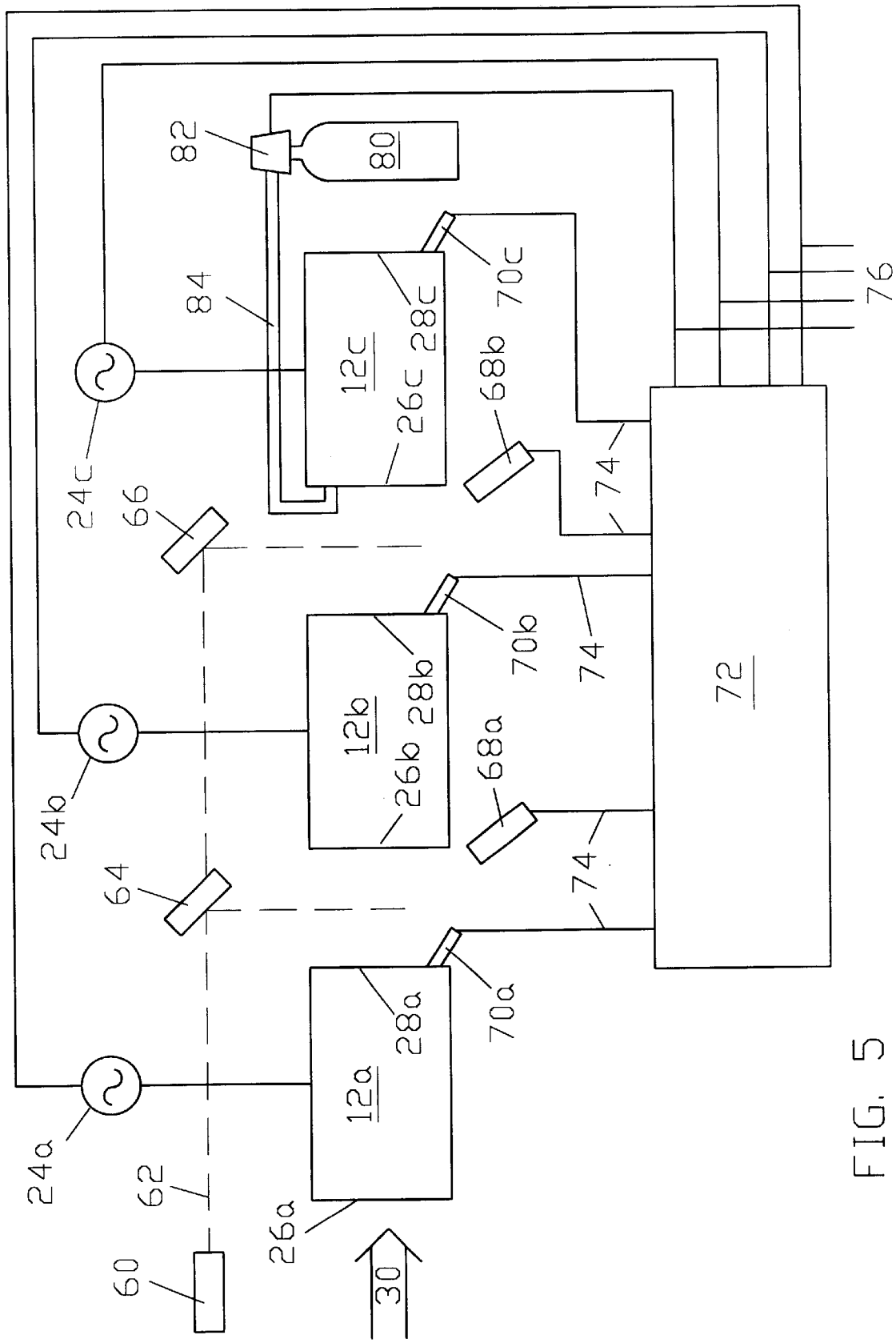
FIG. 5 is a schematic illustration of a preferred device of the present invention.

FIG. 5 is a schematic illustration of a preferred version of device 10, including mechanisms for adaptively controlling device 10 during operation. For clarity, DBD cells 12*a*, 12*b* and 12*c* are represented as boxes, with the serial arrangement of cells 12*a*, 12*b* and 12*c* represented by output end 28*a* being adjacent to input end 26*b* and output end 28*b* being adjacent to input end 26*c*. Two kinds of sensors are illustrated, one for measuring the concentrations of atomic, ionic and molecular species in gas stream 30 as gas stream 30 transits from cell 12*a* to cell 12*b* and from cell 12*b* to cell 12*c*, and the other for monitoring plasma parameters such as temperature, electrical conductivity and plasma density within cells 12*a*, 12*b* and 12*c*.

Gas species concentrations are measured by laser induced fluorescence. To this end, a collimated beam 62 of monochromatic light from a laser 60 is directed by a beam splitter 64 into the region between output end 28*a* and input end 26*b* and by a mirror 66 into the region between output end 28*b* and input end 26*c*. Fluorescence excited in gas stream 30 by beam 62 in the region between output end 28*a* and input end 26*b* and in the region between output end 28*b* and input end 26*c* is detected by spectrometers 68*a* and 68*b*, respectively. This measurement arrangement is only illustrative. The scope of the present invention includes all suitable apparati and methods for measuring gas species concentrations, for example by laser interferometry, by infrared absorption spectrometry, or by simply diverting samples of gas stream 30 for on-line chemical analysis, for example using gas chromatography/mass spectrometer or residual gas analysis. Plasma parameters are measured using Langmuir probes 70*a*, 70*b* and 70*c*, which protrude into gaps 22*a*, 22*b* and 22*c* respectively via output ends 28*a*, 28*b* and 28*c* respectively. Again, this method of measuring plasma parameters is only illustrative, the scope of the present invention including all suitable apparati and methods for measuring plasma parameters. Electrical signals representative of the readings obtained by spectrometers 68*a* and 68*b* and Langmuir probes 70*a*, 70*b* and 70*c* are conveyed by suitable input lines 74 to a microcomputer-based control system 72.

Also shown in FIG. 5 is a source 80, of a pressurized additive gas such as oxygen, nitrogen or hydrogen, connected to cell 12*c* by an electronically controlled valve 82 and a conduit 84. Plasma electrons in the plasma of cell 12*c* ionize the molecules of the additive gas to create free radicals and ionic species that react with the undesired species of gas stream 30 and that interact with the original additive gas molecules. Conduit 84 is disposed to introduce the additive gas into gap 22*c* of cell 12*c* via input end 26*c*. For clarity, only introduction of the additive gas into cell 12*c* is illustrated. In fact, the additive gas may be introduced to all of the DBD cells of device 10. In addition, the additive gas may be introduced to gas stream 30 before gas stream 30 enters device 10 or after gas stream 30 leaves device 10.

Control system 72 transmits control signals to power supplies 24*a*, 24*b* and 24*c* and to valve 82 via suitable control lines 76. The output frequencies and voltages of power supplies 24*a*, 24*b* and 24*c* and the rate of flow of the additive gas into cell 12*c* thus are adjusted by control system 72 in accordance with the readings obtained from spectrometers 68*a* and 68*b* and from Langmuir probes 70*a*, 70*b* and 70*c* to maximize the destruction of undesired gaseous species in gas flow 30. If one of the cells of device 10 is constructed in is the manner of cell 12*h* of FIG. 3, gap width 21 also can be adjusted, by appropriate signals sent from control system 72 to stepping motors 38. For any given gaseous pollution abatement situation, it will be straightforward for one ordinarily skilled in the art to determine how to optimize the frequencies, voltages, gaps and gas flow parameters and to program control system 72 accordingly. For example, one optimal set of parameters for the abatement of the fluorine-containing gases listed above includes a pressure range for gas stream 30 is from about 0.1 Torr to about 200 Torr; a rate of flow on the order of a few hundred sccm for the impurities in gas stream 30 and also on the order of a few hundred sccm for additive gases such as oxygen and hydrogen; and widths of gaps 22a, 22b and 22c between about 1 mm and about 4 mm.

Figure 7:
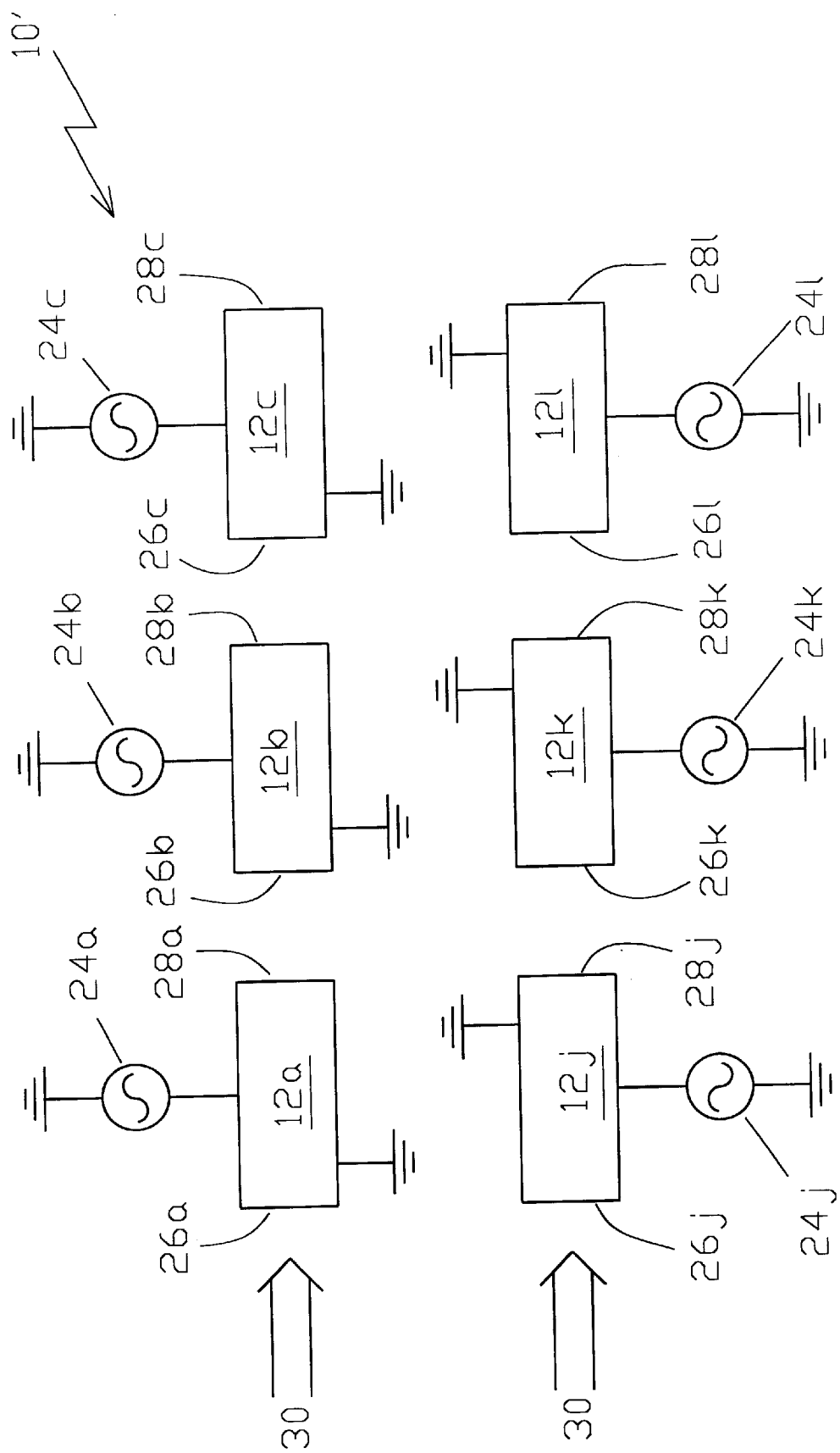

Device 10 also can be operated at atmospheric pressure. This ability to operate at atmospheric pressure greatly expands the range of situations to which device 10 is applicable FIG. 7 is a schematic illustration of an expanded embodiment 10' of device 10. In addition to DBD cells 12a, 12b and 12c, device 10' includes three more DBD cells 12j, 12k and 12l, also in series. Cells 12j, 12k and 12l are collectively in parallel with cells 12a, 12b and 12c. "In parallel" means, not that cells 12j, 12k and 12l are electrically in parallel with cells 12a, 12b and 12c, for, indeed, like cells 12a, 12b and 12c, each of cells 12j, 12k and 12l has its own high frequency power supply 24j, 24k and 24l, respectively; but rather that one portion of gas stream 30 traverses cells 12a, 12b and 12c: entering cell 12a via input end 26a, exiting cell 12a via output end 28a and immediately entering cell 12b via input end 26b, exiting cell 12b via output end 28b and immediately entering cell 12c via input end 26c, and finally exiting cell 12c via output end 28c; and another portion of gas stream 30 traverses cells 12j, 12k and 12l: entering cell 12j via input end 26j, exiting cell 12j via output end 28j and immediately entering cell 12k via input end 26k, exiting cell 12k via output end 28k and immediately entering cell 12l via input end 26l, and finally exiting cell 12l via output end 28l. Embodiment 10' has higher net throughput than embodiment 10, to handle high-volume gas streams 30.

While the invention has been described with respect to a limited number of embodiments, it will be appreciated that many variations, modifications and other applications of the invention may be made.

What is claimed is:

1. A device for destroying unwanted gaseous species in a gas stream, the device comprising:
   (a) a plurality of DBD cells in series, wherein each cell includes an input end adapted for admitting the gas stream into the cell and an output end adapted for discharging the gas stream from the cell;
   (b) a first cell and a second cell of the plurality of DBD cells, wherein the input end of the second cell is adapted for receiving the gas stream that is discharged from the output end of the first cell;
   (c) a first electrode and a second electrode for each of said DBD cells, wherein the first and second electrodes are adapted for a position substantially parallel to the gas stream;
   (d) a dielectric layer proximal at least a first of the first and second electrodes of each of said DBD cells wherein the dielectric layer is adapted for a position between the first of the first and second electrodes, and the gas stream; and
   (e) an independent power supply for each of said DBD cells for providing alternating current to the first and second electrodes of each DBD cell, wherein each of the plurality of cells is adapted for forming a plasma such that gaseous species are destroyed through plasma chemistry.

2. The device of claim 1, wherein each of said power supplies provides alternating current to said each DBD cell at frequencies between about 10 kilohertz and about 3 megahertz.

3. The device of claim 1, wherein each of said power supplies provides alternating current to said each DBD cell at a voltage of between about 300 volts and about 100 kilovolts.

4. The device of claim 1 further comprising sensor disposed to measure a concentration of at least one gas species at the output end of at least the first of the plurality of cells.

5. The device of claim 4, wherein said sensor includes a spectrometer.

6. The device of claim 4, further comprising a control system, for adjusting at least one parameter of said power supply that provides alternating current to the second cell, in response to a gas species measurement by said sensor.

7. The device of claim 1, further comprising a sensor, operationally associated with one of said DBD cells, for measuring at least one plasma parameter within said one of said DBD cells.

8. The device of claim 7, wherein said sensor includes a Langmuir probe.

9. The device of claim 7, further comprising a control system, for adjusting at least one parameter of said power supply that provides said alternating current to said one of said DBD cells, in response to the one plasma parameter measured by said sensor.

10. The device of claim 1 further comprising a mechanism for introducing an additive gas into the gas stream at the input end of at least one of the plurality of DBD cells.

11. The device of claim 1, wherein at least one of said DBD cells includes a mechanism for adjusting at least one parameter of an interior geometry of said at least one cell.

12. The device of claim 11, wherein said at least one parameter of said interior geometry includes a gap width of said at least one cell.

13. The device of claim 1, wherein at least one of said alternating current power supplies is a switching mode resonant power supply.

14. The device of claim 13, wherein said at least one switching mode resonant power supply includes a switch selected from the group consisting of solid state IGBT switches and MOSFET switches.

15. The device of claim 1, wherein at least one of said DBD cells includes an aperture for increasing a pressure of the gas stream within said at least one DBD cell.

16. The device of claim 1, further comprising at least one DBD cell in parallel with said plurality of DBD cells.

17. The device of claim 1, wherein at least one of said DBD cells includes an interior surface exposed to the gas stream, and wherein said interior surface includes a catalyst.

18. The device of claim 17, wherein said catalyst is selected from the group consisting of black platinum and titanium.

19. The device of claim 1 additionally comprising an adaptation of the first and second cells such that destruction of the gaseous species requires at least the first cell and the second cell.

20. A method for destroying gaseous species in a gas stream in a device including a plurality of DBD cells in series, each cell having: (1) a first electrode, (2) a second electrode, (3) a dielectric layer proximal a first of the first and second electrodes, and positioned between the first and second electrodes and the gas stream, (4) input end for admitting the gas stream into the cell, (5) an output end for discharging the gas stream from the cell and (6) an independent power supply for providing alternating current to each of the cells, the method comprising:

(a) activating the power supplies of at least a first and a second cell of the plurality of cells;

(b) causing the gas stream to flow through the plurality of DBD cells, such that the gas stream flows (1) substantially parallel to the electrodes, (2) substantially parallel to the dielectric layer and (3) from the first cell to the second cell;

(c) forming a plasma in at least the first cell; and (d) destroying gaseous species through plasma chemistry in the first cell.

21. The method of claim 20, wherein said alternating currents are provided at frequencies between about 10 kilohertz and about 3 megahertz.

22. The method of claim 20, wherein said alternating currents are provided at voltages between about 300 volts and about 100 kilovolts.

23. The method of claim 20 further comprising detecting a concentration of at least one gas species emerging from at least the first DBD cell.

24. The method of claim 23, further comprising adjusting at least one parameter of the alternating current provided to the first DBD cell in response to the detected concentration of said at least one gas species.

25. The method of claim 20 further comprising measuring at least one plasma parameter within at least one of the plurality of DBD cells.

26. The method of claim 25, further comprising adjusting at least one parameter of said alternating current provided to said at least one of said DBD cells, in response to said measurement of said at least one plasma parameter.

27. The method of claim 20 further comprising chopping said alternating current.

28. The method of claim 27, wherein said chopping is effected at a frequency between about 10 hertz and about 100 kilohertz.

29. The method of claim 20, further comprising introducing an additive gas to the gas stream before the gas stream enters at least one of said DBD cells.

30. The method of claim 29, wherein said additive gas is selected from the group consisting of oxygen, nitrogen and hydrogen.

31. The method of claim 20, wherein at least one of said DBD cells has an interior geometry, the method further comprising adjusting at least one parameter of said interior geometry while the gas stream flows through said DBD cell.

32. The method of claim 31, wherein said at least one parameter of said interior geometry includes a gap width.

33. The method of claim 20 additionally comprising:

(a) forming a plasma in the second cell; and (b) destroying gaseous species through plasma chemistry in the second cell.

34. A device for destroying unwanted gaseous species in a gas stream, the device comprising:

(a) a plurality of DBD cells in series;

(b) for each of said DBD cells, a power supply for providing alternating current to said each DBD cell; and (c) at least one of said DBD cells including (1) an inner electrode having an axially varying transverse width and (2) an outer electrode surrounding at least a portion of the said inner electrode.

* * * * *